(12) United States Patent
Luo

(10) Patent No.: US 10,717,484 B2
(45) Date of Patent: Jul. 21, 2020

(54) WALKING MECHANISM

(71) Applicant: Fengtao Luo, Beijing (CN)

(72) Inventor: Fengtao Luo, Beijing (CN)

(*) Notice: Subject to any disclaimer, the term of this patent is extended or adjusted under 35 U.S.C. 154(b) by 174 days.

(21) Appl. No.: 16/039,474

(22) Filed: Jul. 19, 2018

(65) Prior Publication Data

US 2019/0308678 A1 Oct. 10, 2019

(30) Foreign Application Priority Data

Apr. 4, 2018 (CN) .......................... 2018 1 0295748 7

(51) Int. Cl.
*B62D 57/02* (2006.01)
*B25J 5/00* (2006.01)

(52) U.S. Cl.
CPC .............. *B62D 57/022* (2013.01); *B25J 5/00* (2013.01)

(58) Field of Classification Search
CPC ........ B62D 3/02; B62D 61/12; B62D 57/022; A61G 5/068; B62B 5/02; B25J 5/00
See application file for complete search history.

(56) References Cited

U.S. PATENT DOCUMENTS

| | | | | |
|---|---|---|---|---|
| 3,438,641 A * | 4/1969 | Bradley | ............... | A61G 5/061 |
| | | | | 280/5.28 |
| 3,592,282 A * | 7/1971 | Soileau | ............... | A61G 5/061 |
| | | | | 180/8.2 |
| 3,904,216 A * | 9/1975 | Metrailer | ............... | B62D 61/12 |
| | | | | 280/43 |
| 4,321,976 A * | 3/1982 | Reinke | ............... | B62D 57/00 |
| | | | | 180/8.5 |
| 4,569,409 A * | 2/1986 | Kluth | ............... | A61G 5/061 |
| | | | | 180/8.2 |
| 5,219,412 A * | 6/1993 | Kubo | ............... | A47L 11/14 |
| | | | | 15/49.1 |
| 6,695,084 B2 * | 2/2004 | Wilk | ............... | A61G 5/061 |
| | | | | 180/117 |
| 8,215,423 B2 * | 7/2012 | Terry | ............... | G21F 5/14 |
| | | | | 180/24 |
| 9,937,968 B2 * | 4/2018 | Goren | ............... | B62D 39/00 |
| 2002/0149176 A1 * | 10/2002 | Miller | ............... | B62B 3/027 |
| | | | | 280/651 |
| 2003/0127259 A1 * | 7/2003 | Logstrup | ............... | B62B 5/02 |
| | | | | 180/23 |
| 2003/0183427 A1 * | 10/2003 | Tojo | ............... | A61G 5/046 |
| | | | | 180/8.1 |

(Continued)

*Primary Examiner* — Jacob D Knutson
*Assistant Examiner* — Conan D Duda
(74) *Attorney, Agent, or Firm* — Bay State IP, LLC

(57) ABSTRACT

This disclosure relates to a walking mechanism comprising a walking unit and a control unit, wherein the walking unit comprises a load frame, a mandrel is fixedly arranged on the load frame in a penetrating manner, an inner shaft sleeve sleeves the mandrel, and the inner shaft sleeve can rotate around the mandrel; at least two walking and supporting components are arranged on two sides of the load frame respectively; each walking and supporting component comprises a big gear wheel, an outer shaft sleeve and a supporting seat shaft sleeve; each big gear wheel fixedly sleeves the inner shaft sleeve, and a plurality of lock pin holes are formed in each big gear wheel; each outer shaft sleeve and the corresponding big gear wheel are arranged side by side, and each outer shaft sleeve movably sleeves the inner shaft sleeve.

10 Claims, 4 Drawing Sheets

(56) References Cited

U.S. PATENT DOCUMENTS

| | | | | |
|---|---|---|---|---|
| 2006/0145433 | A1* | 7/2006 | Kim | A61G 5/046 |
| | | | | 280/5.28 |
| 2006/0151218 | A1* | 7/2006 | Goren | A61G 5/061 |
| | | | | 180/24.02 |
| 2012/0175172 | A1* | 7/2012 | Bouhraoua | B62B 5/0033 |
| | | | | 180/8.2 |
| 2014/0239604 | A1* | 8/2014 | Lecompte | B62D 57/022 |
| | | | | 280/28.5 |
| 2014/0326521 | A1* | 11/2014 | Hacikadiroglu | A61G 5/061 |
| | | | | 180/8.2 |
| 2017/0066323 | A1* | 3/2017 | Goren | B60K 7/0007 |
| 2019/0092372 | A1* | 3/2019 | Goren | B60K 7/0007 |
| 2019/0308678 | A1* | 10/2019 | Luo | B62D 57/028 |
| 2020/0000659 | A1* | 1/2020 | Linscott | A61G 5/068 |

* cited by examiner

WALKING MECHANISM

CROSS REFERENCE TO RELATED APPLICATION

This applications claims priority to and takes the benefit of Chinese Patent Application No. 2018102957487 filed on Apr. 4, 2018, the contents of which are herein incorporated by reference.

TECHNICAL FIELD

This disclosure belongs to the technical field of mechanical walking, and specifically relates to a walking mechanism.

BACKGROUND

Most of existing walking mechanisms are wheel-type or crawler-type walking mechanisms or walking mechanisms capable of imitating people walking, and these mechanisms are mostly people walking imitating walking mechanisms or robot dogs capable of imitating American Boston power.

The wheel-type walking mechanism has the defect that the mechanism is low in cross-country performance and cannot climb stairs; the crawler-type walking mechanism has the defect that the mechanism is excessive in weight and cannot enter the room; and when the wheel-type or crawler-type walking mechanism operates in the field, the mechanism also has the defect that the mechanism is huge in volume and is of multiple limitations for mountaineering, obstacle crossing and the like. At present, all popular robot dogs or robots in the market have various defects that the robot dogs or robots are light in load, great in power consumption and complicate in structure, self-balancing cannot be maintained after the system is powered off and the robot dogs or robots are complicate to control.

SUMMARY

For the purpose of at least solving the problems existing in the prior art to a certain extent, this disclosure provides a walking mechanism.

According to the first aspect of the embodiment, this disclosure provides a walking mechanism, comprising:

a walking unit, comprising a load frame, a mandrel, an inner shaft sleeve and a plurality of walking and supporting components; a mandrel being fixedly arranged on the load frame in a penetrating manner, or a mandrel being fixedly arranged on two sides of the load frame respectively; the inner shaft sleeve sleeving the mandrels on two sides of the load frame, and the inner shaft sleeve being capable of rotating around the mandrels; and at least two walking and supporting components being arranged on two sides of the load frame respectively;

each walking and supporting component comprising a big gearwheel, an outer shaft sleeve and a supporting seat shaft sleeve; each big gear wheel fixedly sleeving the inner shaft sleeve, and a plurality of lock pin holes being formed in each big gear wheel; each outer shaft sleeve and the corresponding big gear wheel being arranged side by side, and each outer shaft sleeve movably sleeving the inner shaft sleeve; each supporting seat shaft sleeve fixedly sleeving the corresponding outer shaft sleeve; a telescopic cylinder being arranged on each supporting seat shaft sleeve, and each telescopic cylinder being connected with a landing leg;

a control unit, comprising a main controller and a plurality of auxiliary control units, the auxiliary control units being arranged on the supporting seat shaft sleeves;

each auxiliary control unit comprising an auxiliary controller, a gravity sensor, a gyroscope, an electromagnetic pin and a motor; each auxiliary controller being connected with the corresponding gravity sensor, the corresponding gyroscope and the corresponding electromagnetic pin respectively; each auxiliary controller being connected with the corresponding motor through a motor drive circuit; each auxiliary controller being connected with the corresponding telescopic cylinder through a telescopic cylinder drive circuit; each motor being connected with a small gear wheel, and each small gearwheel being engaged with the corresponding big gear wheel; the electromagnetic pins being matched with the lock pin holes to realize fixed connection status or relative rotation status of the inner shaft sleeve and the outer shaft sleeves; and the auxiliary controllers communicating with the main controller.

Further, when the mandrel is fixedly arranged on the load frame in a penetrating manner, the distances between two ends of the mandrel and the center of the load frame are equal.

Further, a damper is arranged at two ends of the mandrel respectively, and the dampers are connected with the main controller.

Further, the walking mechanism is further internally provided with a wireless communication module, and the main controller communicates with an external upper computer through the wireless communication module; the upper computer is used for remotely controlling the main controller through the wireless communication module, and the main controller is used for sending working condition signals of the walking and supporting components to the upper computer through the wireless communication module.

Further, keys are arranged on the inner shaft sleeve, key holes or key grooves are formed in the centers of the big gear wheels, and the keys are matched with the key holes or key grooves.

Further, each walking and supporting component is internally provided with an electromagnetic pin, and at least one lock pin hole is formed in each big gear wheel.

Furthermore, three or more than three lock pin holes are uniformly formed in the disc surface of each big gear wheel around the circle of each big gear wheel.

Furthermore, two or three or four walking and supporting components are arranged on one side of the load frame; and the lock pin holes in the different walking and supporting components are arranged in a staggered manner.

Further, a fixed wheel is arranged at the bottom of each landing leg.

Further, a sliding spacer bush is further arranged between each big gear wheel and the mandrel.

The technical scheme provided by the embodiment of this disclosure may comprise the following beneficial effects that this disclosure adopts a mechanical and electrical integral structure, the structure is provided with a walking unit and a control unit, the walking unit comprises a mandrel, an inner shaft sleeve and a plurality of walking and supporting components which are completely the same in structures, and the control unit comprises a main controller and a plurality of auxiliary control units; the walking unit adopts a double-layer shaft sleeve structure, the control process of the system can be simplified through the coordination of the lock pin holes and the electromagnetic pins and the engaged movement between the big gear wheels and the small gear wheels, and free conversion between walking and supporting is guaranteed; the control unit can enable the walking mechanism to realize conventional actions such as walking, climbing and jumping only by needing simple telescoping and leg changing control. This disclosure creatively adopts the manner that a plurality of walking and supporting components which are completely the same in structures are arranged side by side, telescoping and leg changing control for the walking and supporting components is realized by using the control unit, and upright walking complexity of the walking mechanism can be simplified.

It should be understood that the above general description and later detail description are just exemplary and explanatory, but cannot restrict this disclosure.

BRIEF DESCRIPTION OF THE DRAWINGS

The accompanying diagrams herein are merged into the specification and constitute a part of the specification, illustrate the embodiment according to this disclosure, and are used for explaining the principle of this disclosure together with the specification.

DESCRIPTION OF THE EMBODIMENTS

The exemplary embodiment is illustrated in detail herein, and typical examples are illustrated in accompanying diagrams. When the following description refers to the accompanying diagrams, except as otherwise noted, same figures in different accompanying diagrams show same or similar elements. The enforcement modes described in the following exemplary embodiment does not represent all enforcement modes which are the same as this disclosure. Oppositely, those are examples of devices and methods which are expatiatory in the claims and are the same in some aspects of this disclosure.

Figure 1:
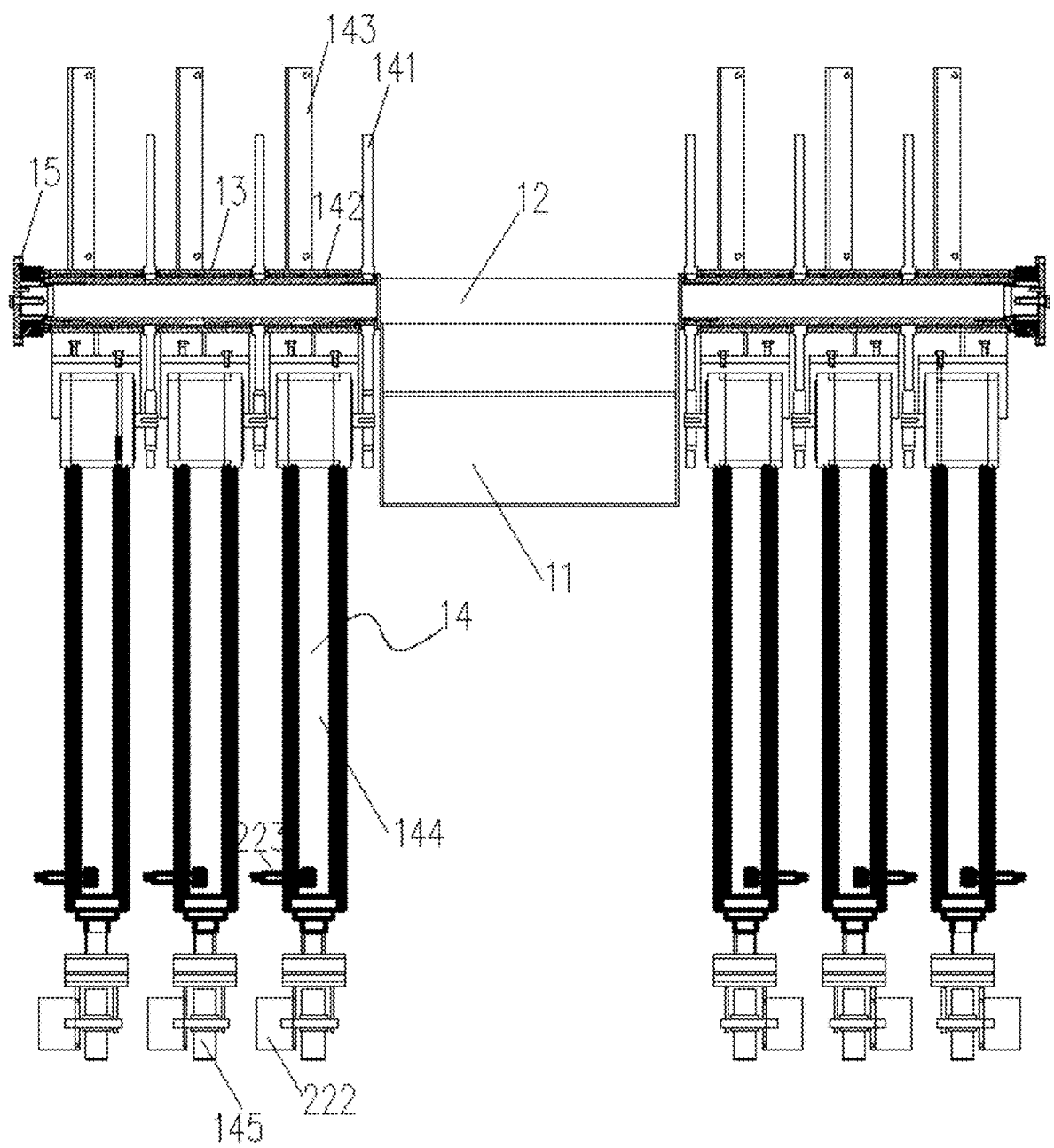
FIG. 1 is a structure schematic diagram of a walking mechanism illustrated according to an exemplary embodiment.
Figure 2:
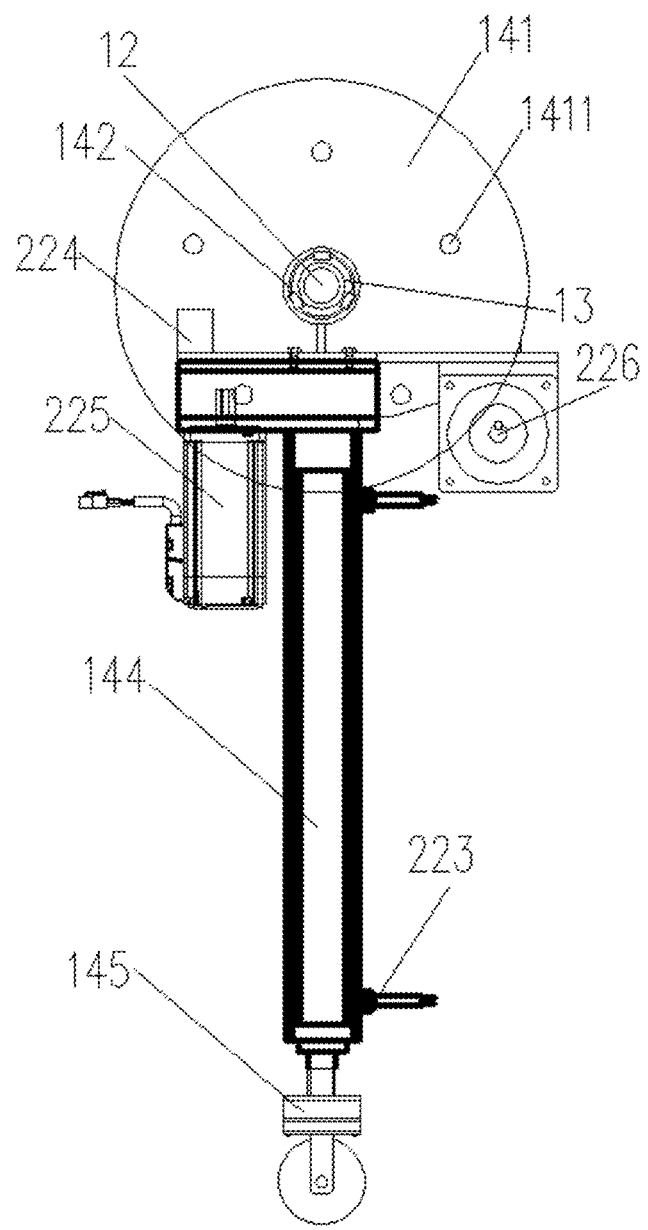
FIG. 2 is a structure schematic diagram of a walking and supporting component in the walking mechanism illustrated according to an exemplary embodiment.
Figure 3:
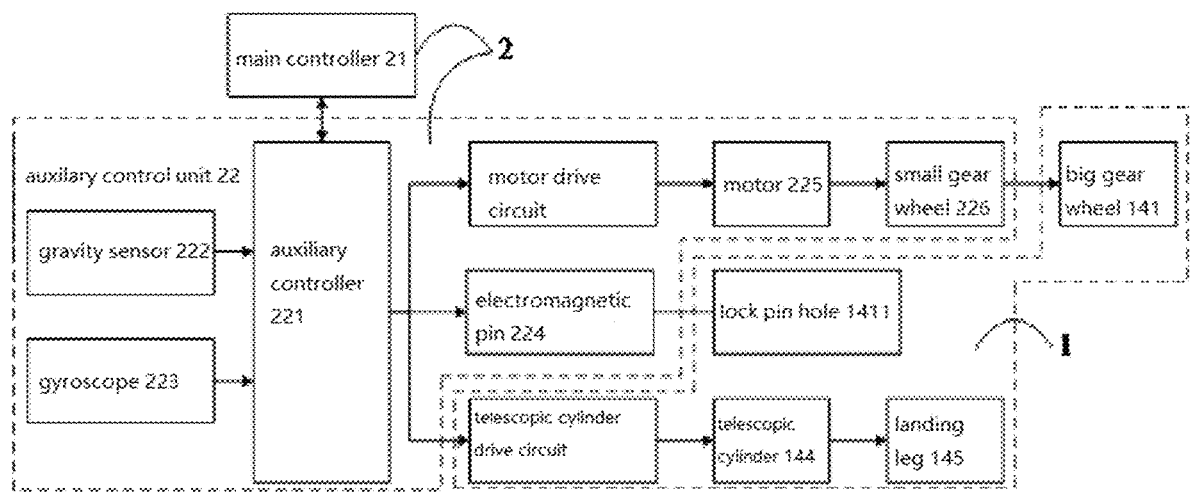
FIG. 3 is the first schematic diagram of a control unit in the walking mechanism illustrated according to an exemplary embodiment.

As shown in FIG. 1 to FIG. 3, the walking mechanism comprises a walking unit 1 and a control unit 2, and the walking unit 1 can realize conventional actions such as walking, climbing and jumping under the control of the control unit 2.

The walking unit 1 comprises a load frame 11, a mandrel 12, an inner shaft sleeve 13 and a plurality of walking and supporting components 14. Wherein, a mandrel 12 is fixedly arranged on the load frame 11 in a penetrating manner, or a mandrel 12 is fixedly arranged on two sides of the load frame 11 respectively. When the mandrel 12 is fixedly arranged on the load frame 11 in a penetrating manner, the distances between two ends of the mandrel 12 and the center of the load frame 11 are equal. When a mandrel 12 is fixedly arranged on two sides of the load frame 11 respectively, the two mandrels 12 adopt the mandrels which are completely the same, and the two mandrels 12 are positioned on the same straight line.

The inner shaft sleeve 13 sleeves the mandrels 12 on two sides of the load frame 11, and the inner shaft sleeve 13 can rotate around the mandrels 12. At least two walking and supporting components 14 are arranged on two sides of the load frame 11 respectively.

Each walking and supporting component 14 comprises a big gear wheel 141, an outer shaft sleeve 142 and a supporting seat shaft sleeve 143. Wherein, each big gear wheel 141 fixedly sleeves the inner shaft sleeve 13, and a plurality of lock pin holes 1411 are formed in each big gear wheel 141. Each outer shaft sleeve 142 and the corresponding big gear wheel 141 are arranged side by side, and each outer shaft sleeve 142 movably sleeves the inner shaft sleeve 13. Each supporting seat shaft sleeve 143 fixedly sleeves the corresponding outer shaft sleeve 142.

A telescopic cylinder 144 is arranged on each supporting seat shaft sleeve 143, and each telescopic cylinder 144 is connected with a landing leg 145.

A control unit 2 comprises a main controller 21 and a plurality of auxiliary control units 22, wherein, the auxiliary control units 22 are arranged on the supporting seat shaft sleeves 143.

Each auxiliary control unit 22 comprises an auxiliary controller 221, a gravity sensor 222, a gyroscope 223, an electromagnetic pin 224 and a motor 225. Each auxiliary controller 221 is connected with the corresponding gravity sensor 221, the corresponding gyroscope 223 and the corresponding electromagnetic pin 224 respectively. Each auxiliary controller 221 is connected with the corresponding motor 225 through a motor drive circuit. Each auxiliary controller 221 is connected with the corresponding telescopic cylinder 144 through a telescopic cylinder drive circuit. Each motor 225 is connected with a small gear wheel 226, and each small gear wheel 226 is engaged with the corresponding big gear wheel 141. The electromagnetic pins 224 are matched with the lock pin holes 1411 to realize fixed connection status or relative rotation status of the inner shaft sleeve 13 and the outer shaft sleeves 142. The auxiliary controllers 221 communicate with the main controller 21. The main controller 21 is used for sending a control command to the auxiliary controllers 221, and the auxiliary controllers 221 are used for controlling the telescopic cylinders 144, the electromagnetic pins 224 and the motors 225 on the corresponding supporting seat shaft sleeves 143 according to the received control command respectively.

Moreover, in the embodiment, the auxiliary controllers 221 in each auxiliary control unit 22 can be omitted directly, and the main controller 21 is directly used for receiving gravity signals collected by the gravity sensors 222 and angle, acceleration and speed signals collected by the gyroscope 223 and controlling the telescopic cylinders 144, the electromagnetic pins 224 and the motors 225 on the corresponding supporting seat shaft sleeves 143.

Specifically, when each auxiliary controller 221 is used for controlling the corresponding electromagnetic pin 224 to be inserted into the corresponding pin lock hole 1411, the corresponding outer shaft sleeve 142 is fixedly connected with the inner shaft sleeve 13 through the corresponding supporting seat shaft sleeve 143, the corresponding electromagnetic pin 224, the corresponding lock pin hole 1411 and the corresponding big gear wheel 141 in sequence, and at this time, the corresponding landing leg 145 connected onto the corresponding supporting seat shaft sleeve 143 fixedly connected with the corresponding outer shaft sleeve 142 can rotate synchronously with the corresponding big gear wheel 141. When each auxiliary controller 221 is used for controlling the corresponding electromagnetic pin 224 to be pulled out from the corresponding lock pin hole 1411, the corresponding outer shaft sleeve 142 can rotate around the inner shaft sleeve 13, at this time, the corresponding landing leg 145 connected onto the corresponding supporting seat shaft sleeve 143 fixedly connected with the corresponding outer shaft sleeve 142 can rotate around the inner shaft sleeve 13 relative to the corresponding big gear wheel 141 so as to realize walking of the landing leg 145; and moreover, when the landing legs 145 walk, the inner shaft sleeves 13 are not influenced, and the walking and supporting components 14 fixed on the outer shaft sleeves 142 fixedly connected with the inner shaft sleeve 13 can support the whole walking mechanism to go ahead.

Under the condition that each electromagnetic pin 224 is pulled out from the corresponding lock pin hole 1411, the corresponding auxiliary controller 221 is used for controlling the corresponding motor 225 to act, the corresponding motor 225 is used for driving the corresponding small gear wheel 226 to rotate, and the corresponding small gear wheel 226 is used for driving the corresponding big gear wheel 141 to rotate. Each auxiliary controller 221 is used for controlling the corresponding telescopic cylinder 144 to perform a telescopic action, and the corresponding telescopic cylinder 144 is used for driving the corresponding landing leg 145 to perform a lifting or landing action.

When the landing legs 145 land, walking for a walking platform is realized through the telescoping of the telescopic cylinders 144.

When the two landing legs 145 or one landing leg 145 guarantee/guarantees the walking platform to walk, the electromagnetic pins 224 on the supporting seat shaft sleeves 143 of the rest of the landing legs 145 without landing are moved out from the lock pin holes 1411 so as to guarantee free state between the supporting seat shaft sleeves 143 and the big gearwheels 141 and between the supporting seat shaft sleeves 143 and the inner shaft sleeve 13. And then, the corresponding motor 225 is used for driving the landing leg 145 without landing to walk forward, after the landing leg 145 without landing walks to corresponding position, the corresponding electromagnetic pin 224 is controlled again to be inserted into the corresponding lock pin hole 1411, and the inner shaft 13 is fixedly connected with the corresponding outer shaft sleeve 142; and before the next step arrives, the landing leg 145 without landing has already gotten ready for supporting, so that continuous walking can be guaranteed. In order to guarantee that the landing leg 145 is prevented from colliding with the ground in the walking process, the corresponding auxiliary controller 221 must control the corresponding telescopic cylinder 144 connected to the landing leg 145 for walking to be in a shortened state.

Wherein, the gravity sensors 222 are used for collecting the gravity signals of the landing legs 145 and sending the gravity signals to the auxiliary controllers 221.

The gyroscopes 223 are used for collecting the walking speed of the landing legs 145 and the included angles between the landing legs 145 and the vertical direction and sending the signals to the auxiliary controllers 221.

The auxiliary controllers 221 are used for correspondingly controlling the walking and supporting components 14 to land, walk or retreat respectively according to the received signals of the gravity sensors 222 and the gyroscopes on the walking and supporting components 14 so as to realize walking for the walking mechanism.

In the embodiment, specifically, keys are arranged on the inner shaft sleeve 13, key holes or key grooves are formed in the centers of the big gearwheels 141, and the keys are matched with the key holes or key grooves. The key holes or key grooves are used cooperatively with the keys, so that the big gear wheels 141 are fixedly connected with the inner shaft sleeve 13.

In one specific embodiment, three or more than three lock pin holes 1411 are uniformly formed in the disc surface of each big gear wheel 141 around the circle of each big gear wheel 141. Therefore, each electromagnetic pin 224 can be fixedly locked in the corresponding lock pin hole, and locking torque of the inner shaft sleeve 13 and the corresponding outer shaft sleeve 142 is guaranteed.

In one specific embodiment, two, three or four walking and supporting components 14 are arranged on one side of the load frame 11. The lock pin holes 1411 in the different walking and supporting components 14 are arranged in a staggered manner. For the walking and supporting components 14 on one side of the load frame 11, when one of the walking and supporting components 14 is used for walking, the rest of the walking and supporting components 14 are used for supporting the walking platform.

Figure 4:
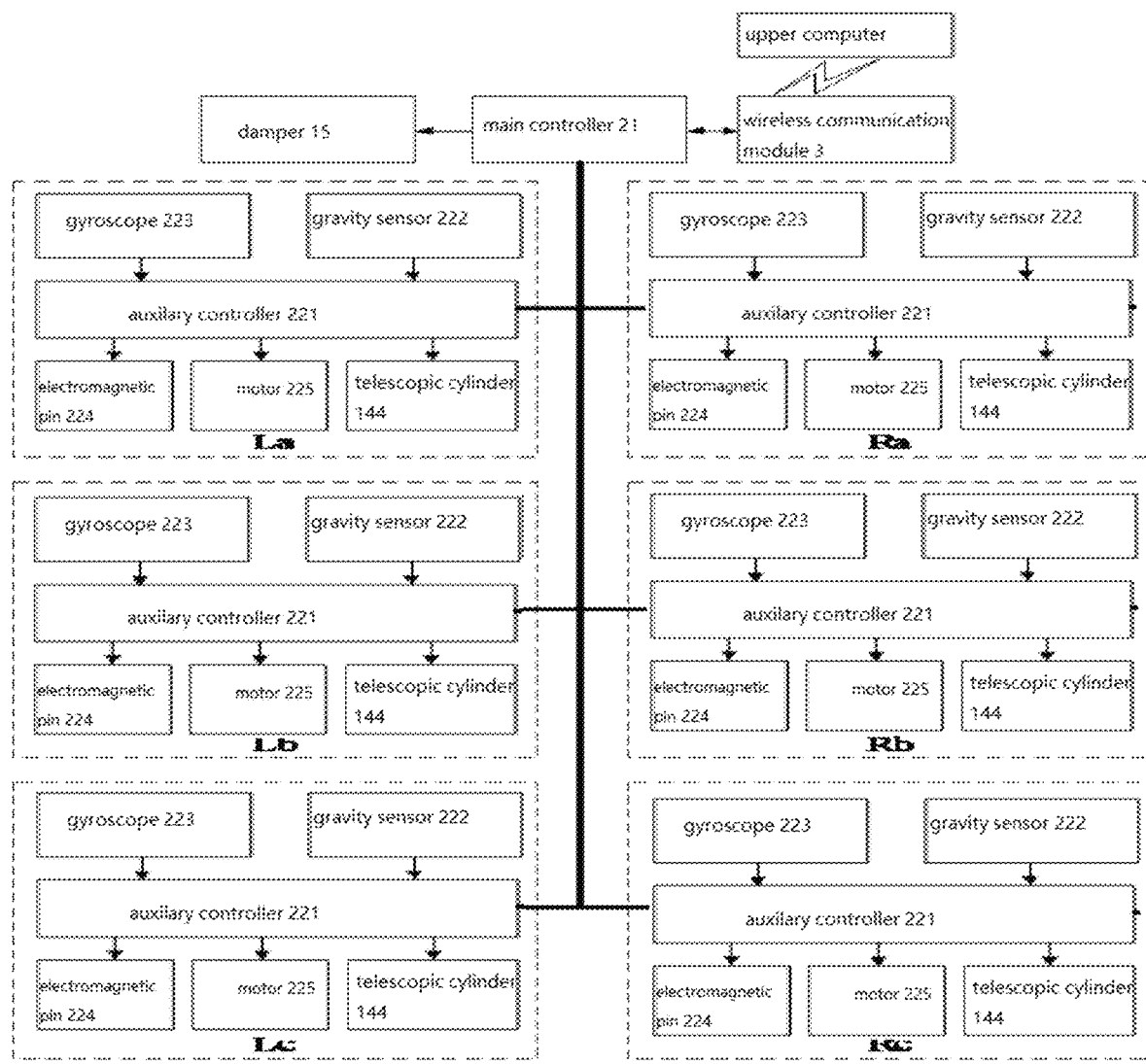
FIG. 4 is the second schematic diagram of the control unit in the walking mechanism illustrated according to an exemplary embodiment.

In one specific embodiment, three walking and supporting components 14 are arranged on two sides of the load frame 11 respectively, and each walking and supporting component 14 is correspondingly provided with an auxiliary control unit 22. As shown in FIG. 4, the three walking and supporting components 14 on the right side of the load frame 11 are indicated by Ra, Rb and Rc from right to left in sequence, and the three walking and supporting components 14 on the left side of the load frame 11 are indicated by La, Lb and Lc from right to left in sequence. Wherein, Ra and La perform a synchronous action, Rb and Lb perform a synchronous action, and Rc and Lc perform a synchronous action.

Supposing in a first state, Ra walks, Rb lands, and Rc retreats; in the next state of the first state, namely in a second state, Ra walks, Rb retreats, and Rc lands; and in the next state of the second state, namely in a third state, Ra lands, Rb walks, and Rc retreats.

Wherein, in the moving process of the walking and supporting components 14 from preset retreating positions to preset walking positions, the auxiliary controllers 221 are used for controlling the electromagnetic pins 224 to be pulled out from the lock pin holes 1411, the auxiliary controllers 221 are used for controlling the motors 225 to act, the motors 225 are used for driving the small gear wheels 226 to rotate, the small gear wheels 226 are used for driving the big gear wheels 141 to rotate, and the walking and supporting components 14 rotate relative to the big gear wheels 141. When the walking and supporting components 14 walk to preset angles, the auxiliary controllers 221 are used for making the telescopic cylinders 144 drive the landing legs to elongate through the telescopic cylinder drive circuit.

In the moving process of the walking and supporting components from the preset walking positions to landing positions, the elongation of the telescopic cylinders 144 remains unchanged.

In the moving process of the walking and supporting components 14 from landing positions to preset retreating positions, when the walking and supporting components 14 retreat to preset angles, the auxiliary controllers 221 are used for making the telescopic cylinders 144 drive the landing legs 145 to be shortened through the telescopic cylinder drive circuit.

Ra to Rc are circulated from the first state to the third state, so that walking for the walking mechanism is realized.

The climbing process of the walking mechanism is similar to the flat road walking process of the walking mechanism, but the expansion and contraction quantity of the telescopic cylinders 144 in the process that the walking and supporting components 14 complete climbing actions are larger than that of the telescopic cylinders 144 in the process that the walking and supporting components 14 complete flat road walking actions.

When the expansion and contraction speed meets the requirement, the walking and supporting components 14 which land simultaneously are used for quickly elongating the telescopic cylinders 144 simultaneously at certain speed, so that a whole robot can get off the land. Moreover, after the whole robot gets off the land, the walking and supporting components 14 are also used for contracting the telescopic cylinders 144 at certain speed, and when the walking mechanism lands, the telescopic cylinders are in a contracted state, so that the center of gravity is reduced, the landing stability of the walking mechanism is improved, and the jumping action of the walking mechanism is completed.

In some embodiments, in the walking process of the walking mechanism, in consideration of the fluctuation of paces, and the load frame 11 can perform a reciprocating motion in the walking direction. In order to inhibit the reciprocating motion of the load frame 11, a damper 15 is arranged at two ends of the mandrel 12 respectively. The dampers 15 are connected with the main controller 21.

In some embodiments, the walking mechanism in this disclosure is further internally provided with a wireless communication module 3, and the main controller 21 communicates with an external upper computer through the wireless communication module 3. The upper computer is used for remotely controlling the main controller 21 through the wireless communication module 3, and the main controller 21 is used for sending working condition signals, of the walking and supporting components, collected by the auxiliary control units 22 to the upper computer through the wireless communication module 3, and the auxiliary control units 22 are convenient for the upper computer to carry out data monitoring.

In one specific embodiment, movable wheels are arranged at the bottoms of the landing legs as fixed wheels, so that the frictional force of the landing legs 145 with the ground in some special actions is reduced conveniently.

In one specific embodiment, a sliding spacer bush is further arranged between each big gear wheel 141 and the mandrel 12, so that the frictional force between the mandrel 12 and each big gear wheel 141 is reduced conveniently.

The walking mechanism in this disclosure smartly adopts a mechanical and electrical integral structure, and the conventional actions such as walking, climbing and jumping for the walking mechanism can be realized only by needing simple telescoping and leg changing control. In the disclosure, a plurality of walking and supporting components 14 which are completely the same in structures are connected on two sides of the load frame 11 in parallel, so that walking and supporting of the landing legs 145 in the walking and supporting components 14 can be converted freely, and upright walking complexity of the walking mechanism can be simplified.

The walking mechanism in this disclosure sufficiently refers to the characteristic of human walking and also sufficiently utilizes the superiority of a mechanical structure relative to human action, the walking mechanism can bear higher effective load through structure simplification. In a limit design, the weight ratio of effective load to the weight of the machine is between 0.66 and 1.0, namely the walking mechanism of 60 kg can bear effective load with the weight of 40 kg. Moreover, through mutual biting of locking mechanisms such as the electromagnetic pins 224, the lock pin holes 1411 and the dampers 15, the walking mechanism can bear various mechanical shocks, such as various recoiling forces of mechanical actions, in an upright state.

About the device in the embodiment, the specific mode for executing the operation of each module has already been described in detail in the embodiment of the method, and the following is not elaborated herein.

It is understandable that same or similar parts in the embodiments can be referred to each other, the unspecified content in some embodiments can refer to same or similar content in other embodiments.

It is noted that, in the description of this disclosure, the terms such as "first" and "second" are just used for description purpose, but cannot be understood to indicate or hint relative importance. Moreover, in the description of this disclosure, except as otherwise noted, the meaning of "a plurality of" indicates at least two.

In the description of this disclosure, the description of the reference terms such as "one embodiment", "some embodiments", "example", "specific example" or "some examples" indicates to be contained in at least one embodiment or example of this disclosure in combination with specific characteristics, structures, materials or characteristics described by the embodiment or example. In the specification, the schematic expression for the above terms possibly indicates same embodiment or example. Moreover, the described specific features, structures, materials or characteristics can be combined in any of one or more embodiments or examples appropriately.

Although the embodiment of this disclosure has already been illustrated and described, it is understood that the embodiment is exemplary but cannot be understood as limitation of this disclosure, and the embodiment can be changed, amended, replaced and converted by a person skilled in the art in the scope of this disclosure.

What is claims is:

1. A walking mechanism comprising:
a walking unit comprising a load frame, a mandrel, an inner shaft sleeve and a plurality of walking supporting components; wherein the mandrel is either fixedly arranged on the load frame in a penetrating manner or the mandrel comprises two pieces, each piece of the mandrel fixedly arranged on two sides of the load frame respectively; the inner shaft sleeve sleeving the mandrel on two sides of the load frame, and the inner shaft sleeve being capable of rotating around the mandrel; and at least two of the walking supporting components being arranged on two sides of the load frame respectively;
each of the walking supporting components comprising a big gear wheel, an outer shaft sleeve and a supporting seat shaft sleeve; each big gear wheel fixedly sleeving the inner shaft sleeve, and a plurality of lock pin holes being formed in each big gear wheel; each outer shaft sleeve and the corresponding big gear wheel being arranged side by side, and each outer shaft sleeve movably sleeving the inner shaft sleeve; each supporting seat shaft sleeve fixedly sleeving the corresponding outer shaft sleeve; a telescopic cylinder being arranged on each supporting seat shaft sleeve and being connected with a landing leg;
a control unit comprising a main controller and a plurality of auxiliary control units, the auxiliary control units being arranged on the supporting seat shaft sleeves;
each of the auxiliary control units comprising an auxiliary controller, a gravity sensor, a gyroscope, an electromagnetic pin and a motor; each auxiliary controller being connected with the corresponding gravity sensor, the corresponding gyroscope and the corresponding electromagnetic pin respectively; each auxiliary controller being connected with the corresponding motor through a motor drive circuit; each auxiliary controller being connected with the corresponding telescopic cylinder through a telescopic cylinder drive circuit; each motor being connected with a small gear wheel, and each small gear wheel being engaged with the corresponding big gear wheel; the electromagnetic pins being matched with the lock pin holes to realize fixed connection status or relative rotation status of the inner shaft sleeve and the outer shaft sleeves; and the auxiliary controllers communicating with the main controller.

2. The walking mechanism according to claim 1, wherein when the mandrel is fixedly arranged on the load frame in a penetrating manner, the distances between two ends of the mandrel and the center of the load frame are equal.

3. The walking mechanism according to claim 1, further comprising a damper arranged at two ends of the mandrel respectively, and the dampers are connected with the main controller.

4. The walking mechanism according to claim 1, further comprising a wireless communication module internally, and the main controller communicates with an external upper computer through the wireless communication module; the upper computer is used for remotely controlling the main controller through the wireless communication module, and the main controller is used for sending working condition signals of the walking supporting components to the upper computer through the wireless communication module.

5. The walking mechanism according to claim 1, wherein that keys are arranged on the inner shaft sleeve, key holes or key grooves are formed in the centers of the big gear wheels, and the keys are matched with the key holes or key grooves.

6. The walking mechanism according to claim 1, wherein each of the walking supporting components is internally provided with an electromagnetic pin, and at least one lock pin hole is formed in each big gear wheel.

7. The walking mechanism according to claim 6, wherein at least three lock pin holes are uniformly formed in the disc surface of each big gear wheel around the circle of each big gear wheel.

8. The walking mechanism according to claim 6, wherein three or four of the walking supporting components are arranged on one side of the load frame; and the lock pin holes in each of the walking supporting components are arranged in a staggered manner.

9. The walking mechanism according to claim 1, wherein a fixed wheel is arranged at the bottom of each landing leg.

10. The walking mechanism according to claim 1, wherein a sliding spacer bush is further arranged between each big gear wheel and the mandrel.

\* \* \* \* \*